US008161145B2

(12) United States Patent
Carpenter et al.

(10) Patent No.: US 8,161,145 B2
(45) Date of Patent: Apr. 17, 2012

(54) METHOD FOR MANAGING OF DENIAL OF SERVICE ATTACKS USING BANDWIDTH ALLOCATION TECHNOLOGY

(75) Inventors: Brian E. Carpenter, Kilchberg (CH); Clark D. Jeffries, Durham, NC (US); Andreas Kind, Kilchberg (CH); Michael S. Siegel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2326 days.

(21) Appl. No.: 10/375,799

(22) Filed: Feb. 27, 2003

(65) Prior Publication Data

US 2004/0170123 A1 Sep. 2, 2004

(51) Int. Cl.
*G06F 15/173* (2006.01)
(52) U.S. Cl. ............................ 709/223; 709/225; 370/229
(58) Field of Classification Search .................. 709/223, 709/225; 370/229
See application file for complete search history.

(56) References Cited

U.S. PATENT DOCUMENTS

| | | | | |
|---|---|---|---|---|
| 5,663,959 A * | 9/1997 | Nakagawa | .............. | 370/236.2 |
| 6,188,698 B1 * | 2/2001 | Galand et al. | .................. | 370/412 |
| 6,657,960 B1 * | 12/2003 | Jeffries et al. | ............... | 370/230.1 |
| 6,771,652 B1 * | 8/2004 | Aydemir et al. | ............... | 370/412 |
| 6,879,560 B1 * | 4/2005 | Cahn | ........................... | 370/230.1 |
| 7,061,862 B2 * | 6/2006 | Horiguchi et al. | ............ | 370/230 |
| 7,085,236 B2 * | 8/2006 | Oldak et al. | ............... | 370/235.1 |
| 7,142,552 B2 | 11/2006 | Jeffries et al. | | |
| 2002/0002686 A1 * | 1/2002 | Vange et al. | ................... | 713/201 |
| 2002/0031134 A1 * | 3/2002 | Poletto et al. | ................ | 370/401 |
| 2002/0032774 A1 * | 3/2002 | Kohler et al. | ................. | 709/225 |
| 2002/0032871 A1 * | 3/2002 | Malan et al. | ................... | 713/201 |
| 2002/0032880 A1 * | 3/2002 | Poletto et al. | ...................... | 714/4 |
| 2002/0035683 A1 * | 3/2002 | Kaashoek et al. | ............ | 713/154 |
| 2002/0064128 A1 * | 5/2002 | Hughes et al. | ............... | 370/229 |
| 2003/0007452 A1 * | 1/2003 | Gorti et al. | .................... | 370/229 |

(Continued)

FOREIGN PATENT DOCUMENTS

JP 01159984 A 3/2001

(Continued)

OTHER PUBLICATIONS

Ibe, Oliver C., Essentials of ATM Networks and Services; Pearson Education Corporate Sales Division, Upper Saddle River, NJ, 1997; p. 100-104.*

(Continued)

*Primary Examiner* — Glenton B Burgess
*Assistant Examiner* — Oleg Survillo
(74) *Attorney, Agent, or Firm* — Yee & Associates, P.C.; Jennifer Davis

(57) ABSTRACT

A method for managing attacks in a computer system is disclosed. The computer system is used in sending, receiving, or sending and receiving a plurality of packets, which include a plurality of administrative packets. The method includes determining whether a congestion of the administrative packets exists. Congestion of the administrative packets indicates that a potential attack exists. The method also includes discarding a portion of the plurality of administrative packets if it is declared that the congestion of the administrative packets exists. The portion of the plurality of packets is sufficient to ensure that a remaining portion of the plurality of packets transmitted is not more than a maximum administrative packet bandwidth limit and, if the plurality of administrative packets present a sufficient offered load, not less than a minimum administrative packet bandwidth guarantee.

27 Claims, 8 Drawing Sheets

U.S. PATENT DOCUMENTS

| | | | | |
|---|---|---|---|---|
| 2003/0058793 A1* | 3/2003 | Rochon et al. | ............ | 370/229 |
| 2003/0074434 A1* | 4/2003 | Jason et al. | ............ | 709/223 |
| 2003/0200441 A1* | 10/2003 | Jeffries et al. | ............ | 713/181 |
| 2003/0223361 A1* | 12/2003 | Hussain et al. | ............ | 370/230 |
| 2004/0151184 A1* | 8/2004 | Wang et al. | ............ | 370/395.2 |
| 2007/0183327 A1* | 8/2007 | Bellows | ............ | 370/230 |

FOREIGN PATENT DOCUMENTS

| | | |
|---|---|---|
| WO | WO9948303 A2 | 9/1999 |
| WO | WO0146807 A1 | 6/2001 |
| WO | WO0159584 A1 | 8/2001 |
| WO | WO0180524 A2 | 10/2001 |
| WO | WO0203653 A2 | 1/2002 |

OTHER PUBLICATIONS

Ibe, Oliver C., Essentials of ATM Networks and Services; Pearson Education Corporate Sales Division, Upper Saddle River, NJ, 1997; p. 100-104.*

Savage, Wetherall, Karlin & Anderson, *Network Support for IP Traceback,*, IEEE/ACM Transaction on Networking, vol. 9, No. 3, Jun. 2001.

Savage, Wetherall, Karlin & Anderson, *Practical Network Support for IP Traceback*, Department of Computer Science and Engineering, University of Washington, Seattle, WA, USA, Copyright 2000 ACM 1-58113-224-7/00/0008.

* cited by examiner

METHOD FOR MANAGING OF DENIAL OF SERVICE ATTACKS USING BANDWIDTH ALLOCATION TECHNOLOGY

FIELD OF THE INVENTION

The present invention relates to computer systems, and more particularly to a method for managing attacks such as denial of service (DoS) attacks.

BACKGROUND OF THE INVENTION

Driven by increasing usage of a variety of network applications, such as those involving the Internet, computer networks are of increasing interest. The Internet can be regarded as a collection of interconnected networks, also called autonomous systems. Autonomous systems are administrated under the same authority or under different authorities. Autonomous systems administered under the same authority are also referred to as clouds. In order to couple portions of a network together, to couple networks, or at the edge of an autonomous system, switches are often used. For example, FIG. 1 depicts a high-level block diagram of a switch 10 which can be used. This invention pertains to a switch 10 that includes a switch fabric 24 coupled with blades 7, 8 and 9. Each blade 7, 8 and 9 is generally a circuit board and includes at least a network processor 2 coupled with ports 4. The term network processor is interpreted broadly to include any packet-processing device in which packet recognition and flow control are programmable. Thus, the ports 4 are coupled with links that convey packets to or from other network nodes or hosts (not shown). The blades 7, 8 and 9 can provide traffic to the switch fabric 24 and accept traffic from the switch fabric 24. Thus, any host connected with one of the blades 7, 8 or 9 can communicate with another host connected to another blade 7, 8 or 9 or connected to the same blade. Although depicted as including network processors 2, in lieu of network processors 2, the switch 10 could include an equivalent level of programmability provided using another mechanism.

FIG. 2A depicts another simplified block diagram of the switch 10, illustrating some of the functions performed by network processors. The switch 10 couples links to other nodes or hosts (not shown) connected with ports A 12 with those links to other nodes or hosts (not shown) connected with ports B 36. The switch 10 performs various functions including classification of data packets provided to the switch 10, transmission of data packets across the switch 10 and reassembly of information into packets. These functions are provided by the classifier 18, the switch fabric 24 and the reassembler 30, respectively. The classifier 18 classifies packets which are provided to it and breaks each packet up into convenient-sized portions, which will be termed cells. The switch fabric 24 is a matrix of connections through which the cells are transmitted on their way through the switch 10. The reassembler 30 reassembles the cells into the appropriate packets. The packets can then be provided to the appropriate port of the ports B 36, and output through links to the next hop or final destination nodes or hosts. The classifier 18 may be part of one network processor 1, while the reassembler 30 may be part of another network processor 5. The portions of the network processor 1 and the network processor 5 depicted perform functions for traffic traveling from ports A 12 and to ports B 36, respectively. However, the network processors 1 and 5 also perform functions for traffic traveling from ports B 36 and to ports A 12, respectively. Thus, each network processor 1 and 5 can perform classification and reassembly functions. Furthermore, each network processor 1 and 5 can be a network processor 2 shown in FIG. 1.

Referring back to FIG. 2A, due to bottlenecks in transferring traffic across the switch 10, data packets may be required to wait prior to execution of the classification, transmission and reassembly functions. As a result, queues 16, 22, 28 and 34 may be provided. Coupled to the queues 16, 22, 28 and 34 are enqueuing mechanisms 14, 20, 26 and 32. The enqueuing mechanisms 14, 20, 26 and 32 place the packets or cells into the corresponding queues 16, 22, 28 and 34. Although the queues 16, 22, 28 and 34 are depicted separately, one of ordinary skill in the art will readily realize that some or all of the queues 16, 22, 28 and 34 may be part of the same shared physical memory resource.

Those skilled in the art will understand that such queues can represent processing bottlenecks or points of congestion. In particular, lengthy queuing delays diminish or cancel the value of packets that are eventually processed. Therefore proper operation of a network can include the purposeful and proactive discarding of some packets during instances of congestion by the enqueuing mechanisms 14 and 26.

FIG. 2B depicts further details of mechanisms in one such switch 10'. Many of the components of the switch 10' are analogous to components of the switch 10. Such components are, therefore, labeled similarly. For example, the ports A 12' in the switch 10' correspond to the ports A 12 in the switch 10. In the switch 10', the queue A 16' and the queue A 22' share a single memory resource 19. Similarly, the queue 28' and the queue 34' are part of another single memory resource 31. Thus, in the switch 10', the queues 16', 22', 28' and 34' are logical queues partitioned from the memory resources 19 and 31.

FIG. 3 depicts various clouds 50, 52, 54, 56, 60, 62, 64, and 70 coupled via a cloud with high-bandwidth links and fast routers, typically referred to as backbone 80. Some switches 10 and/or 10' can reside at the boundaries of the clouds 50, 52, 54, 60, 62, 64 and 70 and the backbone 80 at which connections are made. For example, the cloud 50 typically includes one or more switches 10/10' at the connections made to clouds 52, 54, and 56. Furthermore, note that the clouds 50, 52, 54, 56, 60, 62, 64 and 70 can be viewed hierarchically depending upon their connection to the backbone 80 and the number of the remaining clouds 50, 52, 54, 56, 60, 62, 64 and 70 to which they are connected. For example, the cloud 56, which is only connected to the cloud 50, may be small and have a relatively peripheral connection to the backbone 80. The cloud 54 may be larger and higher in the hierarchy, serving as a connection point to the backbone 80 and other clouds for the clouds 50, 52, and 56.

Traffic, including data packets and administrative packets (also called control packets), traverses the clouds 50, 52, 54, 56, 60, 62, 64, and 70 and the backbone 80 at least in part by traveling through some switches 10/10'. The switches 10/10' may provide a gateway to the Internet or other clouds 50, 52, 55, 56, 60, 62, 64, and 70. In addition, the switches 10/10' may also be used to provide customers with different services based, for example, on the price paid by a consumer for service. A consumer may wish to pay more to ensure a faster response or to ensure that the traffic for the customer will be transmitted even when traffic for other customers is dropped due to congestion. Thus, the concept of differentiated services has been developed. Differentiated services can provide different levels of service, for different customers, or different flows of traffic through the network.

Differentiated Services (DiffServ) is an established Internet Engineering Task Force (IETF) standard for providing differentiated services (see IETF RFC 2474 and related RFCs). The DiffServ architecture recognizes the importance of clouds for providing service guarantees in the Internet and is concerned with intra-cloud service levels. Appropriate service level agreements are assumed between clouds. At the edge of a cloud, incoming traffic is mapped into a limited number of traffic behavior aggregates. A behavior aggregate flow can be viewed at each point of potential congestion as the aggregate of all traffic of the same class. A class can mean a common technical requirement, such as very low latency, a common economic value, or any combination of such concepts. Furthermore, some traffic of sufficient value can be organized in a pipeline from one edge of a cloud or combination of clouds to another edge of a cloud or combination of clouds. Potentially, one behavior aggregate flow could have its own pipeline, but in general the local confluence of all traffic in one class or behavior aggregate flow at one point of congestion determines the treatment of packets in the class without regard to details of session membership.

Thus, within each behavior aggregate flow at each point of potential congestion there could be packets from one, a few, or many sessions between individual hosts. However, DiffServ is unconcerned with session membership within a behavior aggregate flow. Instead, DiffServ is concerned with the differentiated treatment of the behavior aggregate flows inside a cloud. According to DiffServ, excess bandwidth is to be allocated fairly between behavior aggregate flows. Furthermore, DiffServ defines fairness by providing criteria for measuring the level of service provided to each behavior aggregate flow. For example, to provide differentiated services, aggregate flows could be marked "red," "yellow," or "green." When insufficient bandwidth exists to support the current flows in one or more of the behavior aggregate flows, packets in pipelines marked red could be discarded to a greater degree than packets in behavior aggregate flows marked yellow. Similarly, packets in behavior aggregate flows marked yellow could be discarded to a greater degree than packets in behavior aggregate flows marked green. Thus, three levels of service could be provided.

Traffic having different levels of services may travel through the clouds 50, 52, 54, 56, 60, 62, 64, and 70. However, one of ordinary skill in the art will readily realize that the clouds 50, 52, 54, 56, 60, 62, 64, and 70 and the systems within the clouds 50, 52, 54, 56, 60, 62, 64, and 70 are vulnerable to attack. In particular, individuals can generate malicious traffic through the clouds 50, 52, 54, 56, 60, 62, 64, and 70 which would adversely affect the performance of another system within the same cloud or system(s) in other clouds. For example, an individual with connectivity to one of the clouds, such as the cloud 50, could initiate an attack, such as a denial of service (DoS) attack, on a node or nodes in another cloud such as the cloud 70. For example, system(s) in the cloud 50 could flood system(s) in the cloud 70 with administrative packets such as SYN, FIN, RST packets in the protocol TCP; any ICMP packets; or analogous administrative, control, or signaling packets in any other protocols such as in SCTP. This DoS attack could escape the notice of the administrator of the corresponding autonomous system within the cloud 50. The DoS attack could adversely affect the performance of systems within the cloud 70, result in a significant loss of resources, and require a significant investment of resources for system recovery. In addition, the administrator of the cloud 50 could be financially liable for damage done to the systems of the cloud 70. Consequently, it is desirable to manage DoS attacks to limit their adverse effects.

FIG. 4 depicts a conventional method 90 for managing DoS attacks in switches such as the switches 10/10' and clouds such as the clouds 50, 52, 54, 56, 60, 62, 64, and 70. It is determined whether the rate at which administrative packets of a certain type traverse the switch 10/10' exceeds a particular maximum level, via step 92. If not, then step 92 is periodically repeated. If so, then a sufficient number of administrative packets are dropped so that the traffic in administrative packets traversing the switch 10/10' is suppressed to the maximum level, via step 94.

Although the conventional method 90 functions, one of ordinary skill in the art will readily recognize that the conventional method 90 is a rough, simplistic mechanism for managing malicious traffic through the clouds 50, 52, 54, 56, 60, 62, 64, and 70. Only a comparison of an observed rate to a maximum bandwidth indicates that any action should be taken to manage attacks. In addition, the conventional method 90 merely prevents the administrative packets from exceeding the maximum level. Thus, further improvement in the performance of the switch 10/10' is desirable.

Accordingly, what is needed is a system and method for providing better management of denial of service attacks. The present invention addresses such a need.

SUMMARY OF THE INVENTION

The present invention provides a method for managing attacks in a computer system. The computer system is used in sending, receiving, or sending and receiving a plurality of packets, which include a plurality of administrative packets. The method includes determining whether congestion of administrative packets, as defined in the present application, exists. Congestion of the administrative packets indicates that a potential attack exists. The method also comprises discarding a portion of the plurality of administrative packets if it is declared that the congestion of the administrative packets exists. The portion of the plurality of packets is sufficient to ensure that a remaining portion of the plurality of packets transmitted is not more than a maximum administrative packet bandwidth and, if sufficient offered traffic load exists, not less than a minimum administrative packet bandwidth.

According to the method disclosed herein, the present invention allows denial of service attacks to be detected and accounted for gracefully, allowing for high utilization, low latency, fast convergence to a desired allocation and fair allocation in that excess bandwidth is allocated fairly among different pipes.

DETAILED DESCRIPTION OF THE INVENTION

Figure 1:
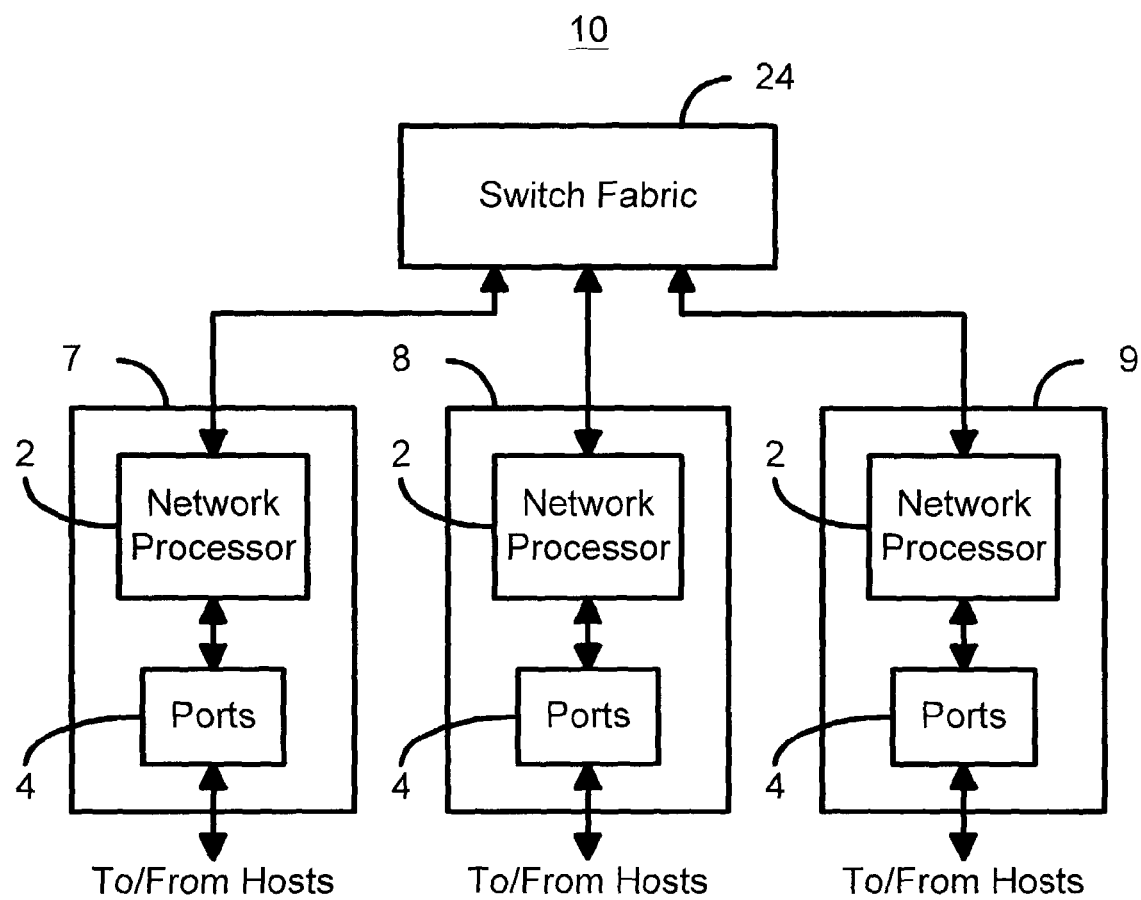
FIG. 1 is a high-level block diagram of a switch.

The present invention relates to an improvement in computer systems and computer networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for managing attacks in a computer system. The computer system is used in sending, receiving, or sending and receiving a plurality of packets, which include a plurality of administrative packets. The method and system comprise determining whether a congestion of the administrative packets exists. Congestion of the administrative packets indicates that a potential attack exists. The method and system also comprise discarding a portion of the plurality of administrative packets if it is declared that congestion exists. The present invention includes several definitions of congestion, and the different definitions can be used individually or in combinations. The portion of the plurality of packets is sufficient to ensure that a remaining portion of the plurality of packets transmitted is not more than a maximum administrative packet bandwidth and, if sufficient offered traffic exists, not less than a minimum administrative packet bandwidth.

According to the system and method disclosed herein, the present invention allows denial of service attacks to be detected and managed gracefully, and at the same time assuring high utilization, low latency, fast convergence to a desired allocation and fair allocation in that excess bandwidth is allocated at each point of potential congestion predictably and fairly among different behavior aggregate flows or pipes.

The present invention will be described in terms of particular computer systems, such as switches, network processors, gateways, autonomous systems, and clouds. However, one of ordinary skill in the art will readily recognize that this method and system will operate effectively for other and/or additional computer systems. The present invention is also described in the context of switches including network processors. One of ordinary skill in the art will recognize that the present invention is applicable to switches not including network processors, but which have an analogous level of programmability. The present invention is also described in the context of denial of service attacks. However, one of ordinary skill in the art will also readily recognize that the method and system operate effectively for other types of attacks involving anomalously large flow rates of certain types of packets. The present invention is described in the context of switches located at the edges of clouds. However, one of ordinary skill in the art will readily recognize that the computer systems could be located elsewhere. In addition, one of ordinary skill in the art will readily recognize that the present invention could be employed only at selected clouds while retaining a high degree of effectiveness.

Figure 5:
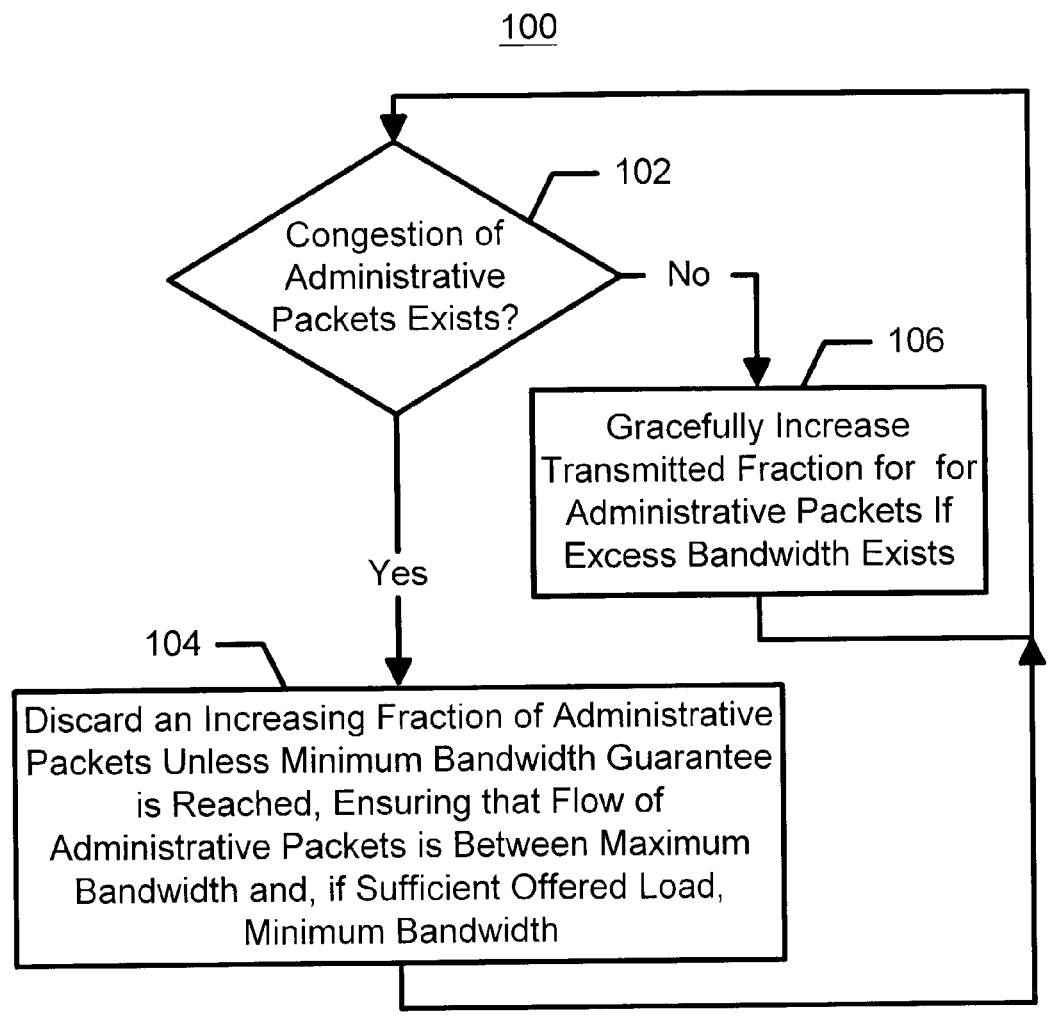
FIG. 5 is a high-level flow chart depicting one embodiment of a method in accordance with the present invention for managing DoS attacks, preferably using a switch.

To more particularly illustrate the method and system in accordance with the present invention, refer now to FIG. 5, depicting one embodiment of a method 100 for managing attacks, such as a denial of service attacks, in a computer system. The method 100 is preferably accomplished using technology described in U.S. Pat. No. 7,142,552 entitled ""METHOD AND SYSTEM FOR PRIORITY ENFORCEMENT WITH FLOW CONTROL" and assigned to the assignee of the present invention. Applicants hereby incorporate by reference the above-mentioned U.S. Pat. No. 7,142, 552. The method 100 can be used with the switch 10 or 10' shown in FIGS. 1, 2A and 2B. Thus, the method 100 can be carried out in a switch 10 having multiple blades 7, 8 and 9 and multiple ports on each blade 7, 8 or 9. In addition, for clarity, the method 100 will be described in conjunction with the enqueuing mechanism 20 and queue 22 of switch 10 depicted in FIG. 2A. However, the method 100 can be used with the enqueuing mechanism 14 and queue 16 of switch 10, with the enqueuing mechanism 26 and queue 28 of switch 10, or with other switches (not shown) having different and/or additional components.

The method 100 is preferably repeated at a constant frequency. It is also preferably used to manage attacks at when traffic enters or leaves a cloud 50, 52, 54, 56, 60, 62, 64, or 70. Thus, the switch 10 is preferably located at the edge of a cloud 50, 52, 54, 56, 60, 62, 64, or 70 and provides traffic to or from an external destination or source, respectively. The method 100 will, therefore, be described in the context of the cloud 54 receiving or sending packets. However, nothing prevents the method 100 from being used in another portion of the cloud 50, 52, 54, 56, 60, 62, 64, or 70, between individual hosts, between networks, and/or between autonomous systems in a cloud 50, 52, 54, 56, 60, 62, 64, or 70. Moreover, the method 100 is preferably performed in addition to differentiated services being performed. Consequently, in the absence of action being taken, as described below, excess bandwidth is preferably fairly allocated among different behavior aggregate flows at points of potential congestion.

Figure 2A:
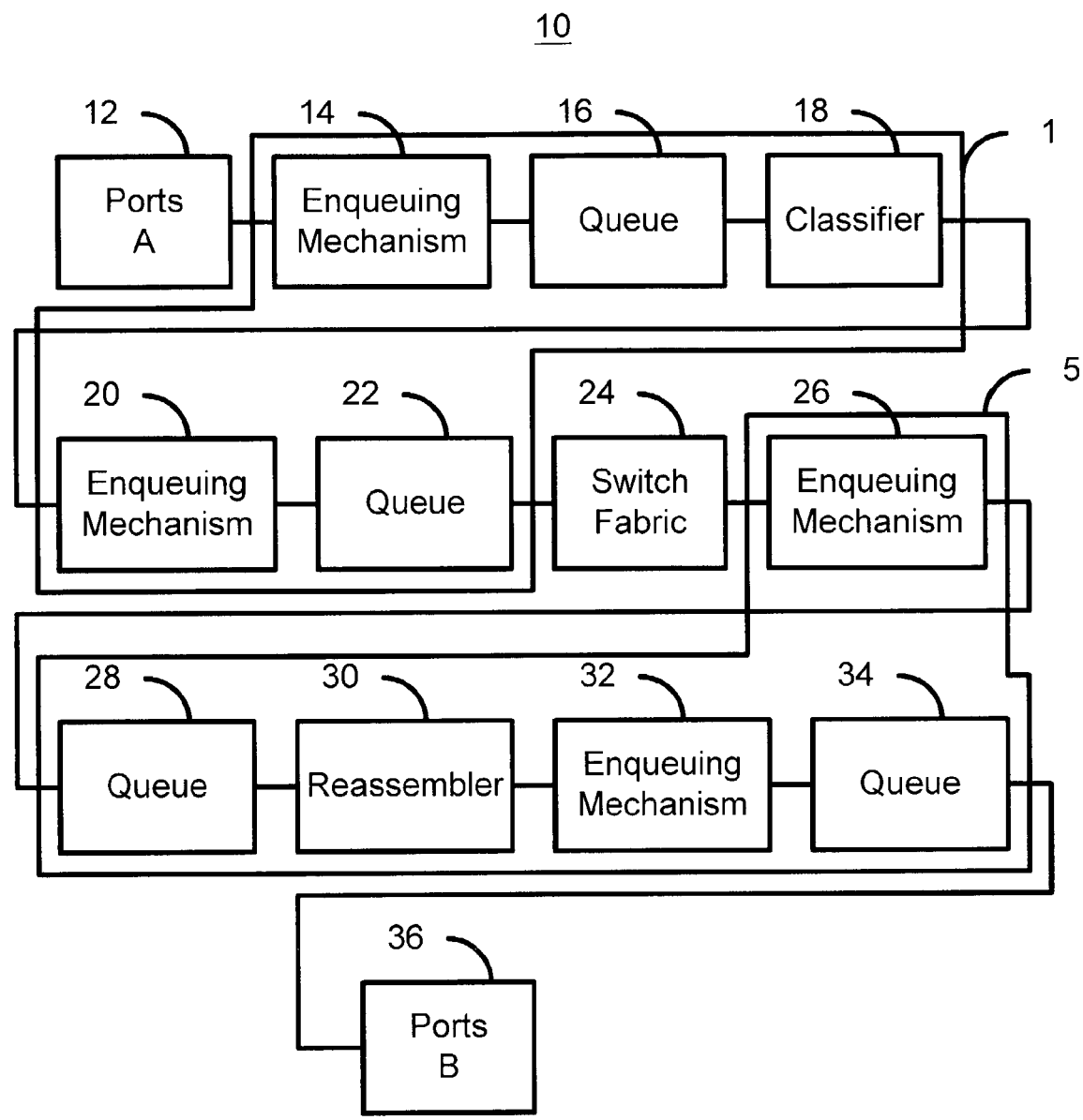
FIG. 2A is a simplified block diagram of a switch.
Figure 2B:
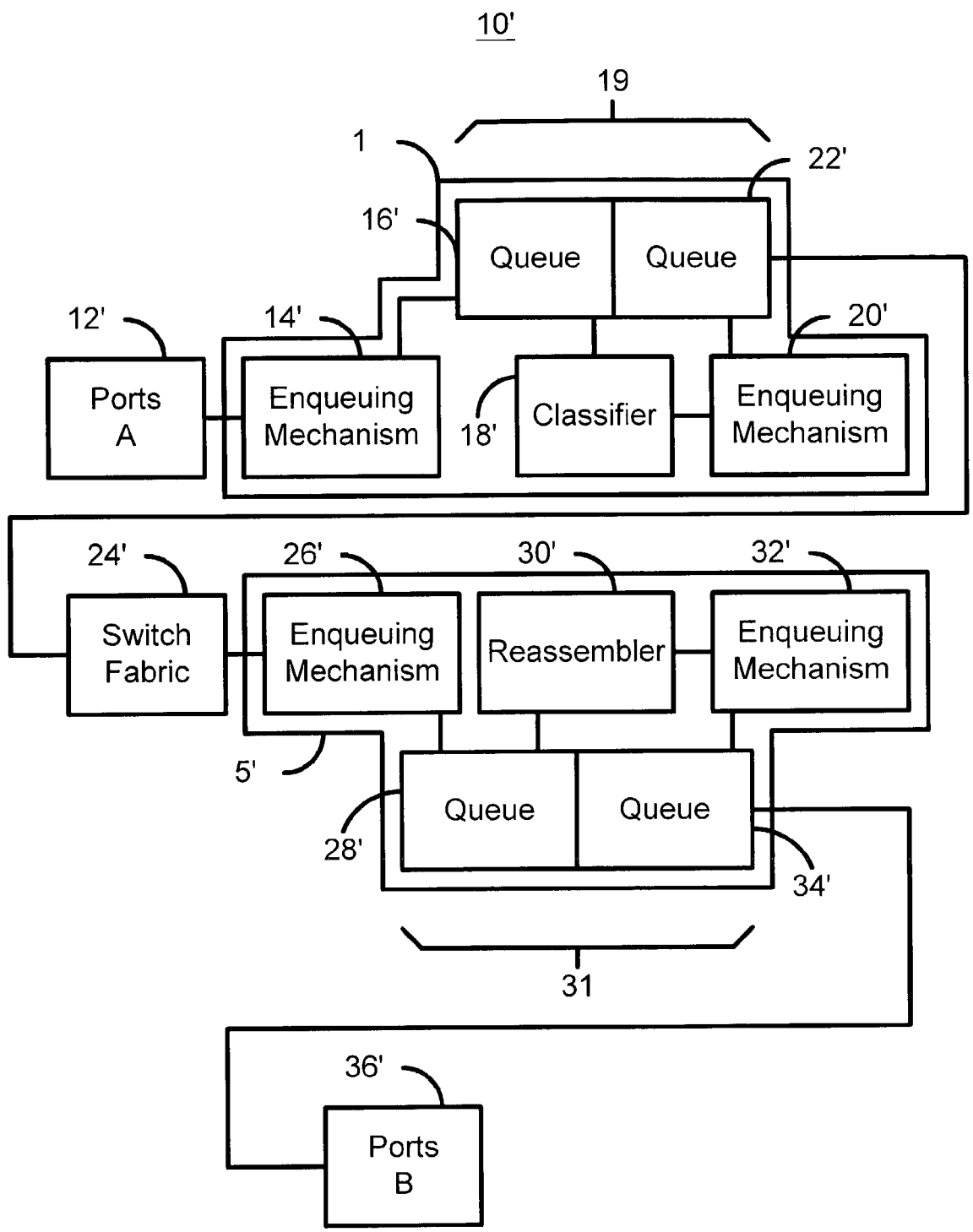
FIG. 2B is a simplified block diagram of another switch.
Figure 3:
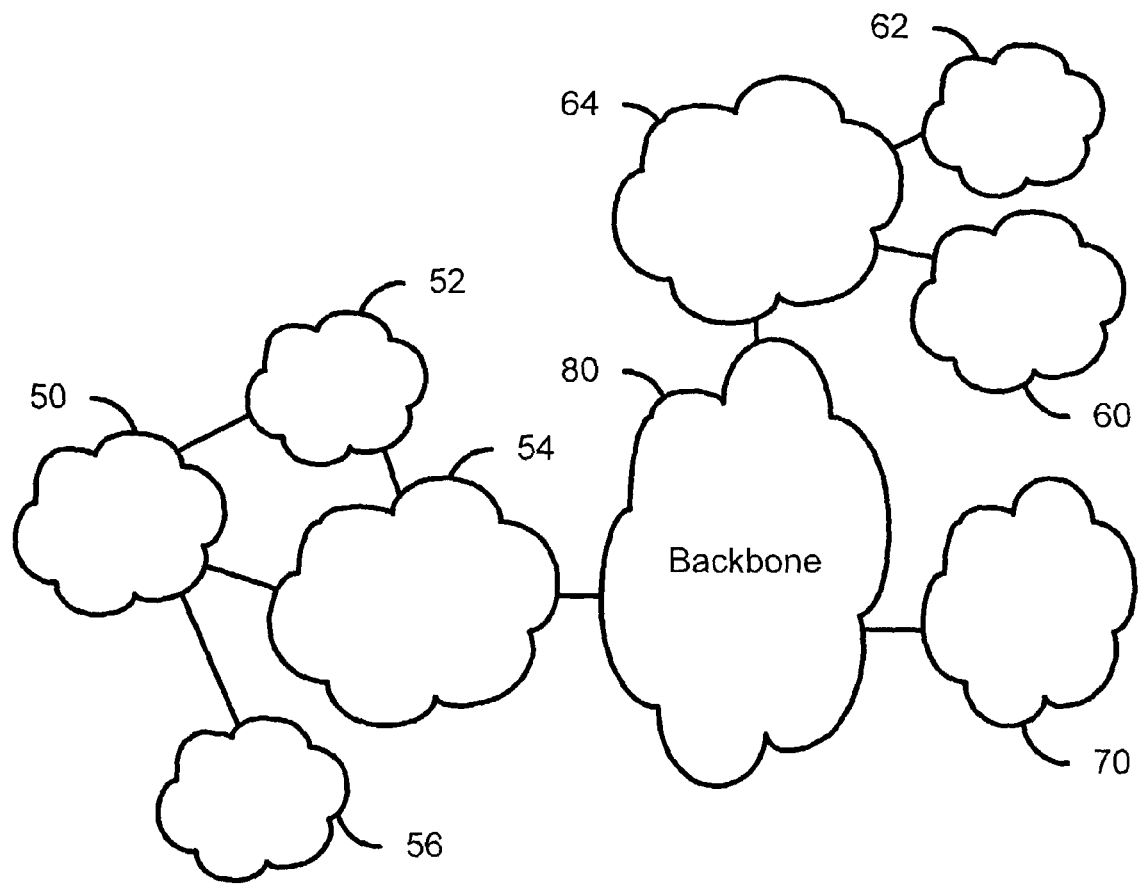
FIG. 3 is a simplified block diagram of a number of interconnected clouds.
Figure 4:
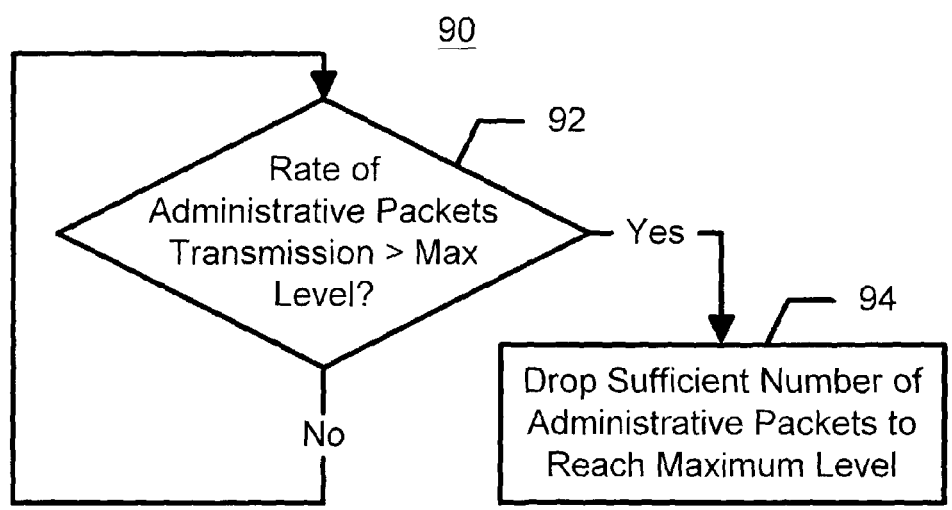
FIG. 4 is a flow chart depicting a conventional method for managing attacks such as DoS attacks using a switch.

Referring to FIGS. 2A and 5, the method 100 preferably commences after the network administrator for the cloud 54, or other authorized user, has set a minimum bandwidth guarantee and maximum bandwidth limit for administrative packets. Note that the minimum bandwidth guarantee could be zero. Alternatively, the minimum bandwidth guarantee and the maximum bandwidth limit could be equal. In a preferred embodiment, the minimum bandwidth guarantee and the maximum bandwidth limit are for all administrative packets such as all SYN, SYN/ACK, RST, FIN packets in TCP or all ICMP packets. However, in an alternate embodiment, there can be different minimum and maximum bandwidths assigned for different types of administrative packets. Thus, for example, RST packets may be treated differently than SYN packets.

Whether congestion exists for the administrative packets is determined via step 102. In a preferred embodiment, step 102 is performed by the enqueuing mechanism 20 for the queue 22. Step 102 preferably includes determining whether some portion of the administrative packets in the aggregate flow meets or exceeds the corresponding maximum bandwidth limit. For example, if the maximum bandwidth limit described above is for all administrative packets, step 102 preferably determines whether all of the administrative packets flowing through the switch 10 would exceed the corresponding maximum bandwidth limit. In another embodiment, statistics for the queue 22 can be used to determine whether congestion exists in step 122. For example, the occupancy of the queue, the rate of change of the occupancy of the queue, or other statistics could be used as a measure of congestion of administrative packets in step 102. Furthermore, other measures of congestions, such as suspicious randomness (described below), can also be used. In a preferred embodiment, a simple OR of all selected conditions for congestion could be used. Alternative embodiments could use AND and OR operations on combinations of such signals. For example, in yet another embodiment, statistics for the queue 22 can be combined with determination of suspicious randomness. The occupancy of the queue 22, the rate of change of the occupancy of the queue 22, or other statistics could be used as a measure of congestion that, when combined with suspicious randomness, would lead to excessive randomness being determined to exist.

If it is determined that congestion exists, preferably by any suitable combination of AND or OR operations applied to congestion signals, then a portion of the plurality of administrative packets is discarded, via step 104. The portion of the plurality of packets discarded in step 104 is sufficient to ensure that a remaining portion of the administrative packets transmitted is not more than the maximum packet bandwidth limit and, provided sufficient offered traffic exists, not less than the minimum bandwidth guarantee. Sufficient offered traffic exists when the traffic of administrative packets entering the enqueuing mechanism 20 is at least the minimum bandwidth guarantee. If the maximum bandwidth limit is exceeded, then the portion of administrative packets discarded preferably rapidly increases and drives the rate of transmitted administrative packets in the pipeline to at or below the maximum bandwidth limit. In a preferred embodiment, if congestion signal continuously is true, then the portion of administrative packets discarded rapidly increases and drives the rate of transmitted administrative packets in the pipeline to the minimum bandwidth guarantee. For example, the portion of administrative packets transmitted may be exponential decreased. In other words, the portion of the administrative packets transmitted is repeatedly multiplied by a positive number less than one, such as 31/32, at every instance of a certain time interval to rapidly drive the administrative traffic to the minimum bandwidth. However, in an alternate embodiment, a different number of administrative packets are discarded in step 104. In addition, the rates of certain administrative packets discarded in step 104 preferably correspond to the administratively configured minimum bandwidth guarantee and maximum bandwidth limit. For example, if the minimum bandwidth guarantee and maximum bandwidth limit described above are for all administrative packets, step 104 preferably discards a portion of all administrative packets. In addition, step 104 is preferably performed by the enqueuing mechanism 20. As a result, the discarded administrative packets preferably do not reach the corresponding queue 22. The discard mechanism periodically returns to 102 to refresh the discard rate.

If it is determined that congestion does not exist for the administrative packets and if there is excess bandwidth as defined above, then a portion of the excess bandwidth may be allocated to the administrative packets, via step 106. For example, the fraction of transmitted administrative packets may be increased linearly until some limit is reached. Note that step 106 could be implemented in accordance with the method and apparatus described in the above-identified U.S. Pat. No. 7,142,552 entitled "METHOD AND SYSTEM FOR PRIORITY ENFORCEMENT WITH FLOW CONTROL". Step 102 is then returned to.

Because congestion of administrative packets is used as a trigger for discarding a greater portion of the administrative packets traveling through the switch 10, the method 100 can manage attacks, such as DoS attacks. Furthermore, because of the use of minimum and maximum administrative packet bandwidth values, the method 100 can more effectively protect against attacks, such as DoS attacks, by rapidly but gracefully reducing the number of administrative packets flowing through the switch while improving performance of the switch 10. For example, excess bandwidth is still allocated in a fair manner, and the fraction of administrative packets discarded may then be varied to ensure that an appropriate amount of suspicious traffic is discarded.

Figure 6:
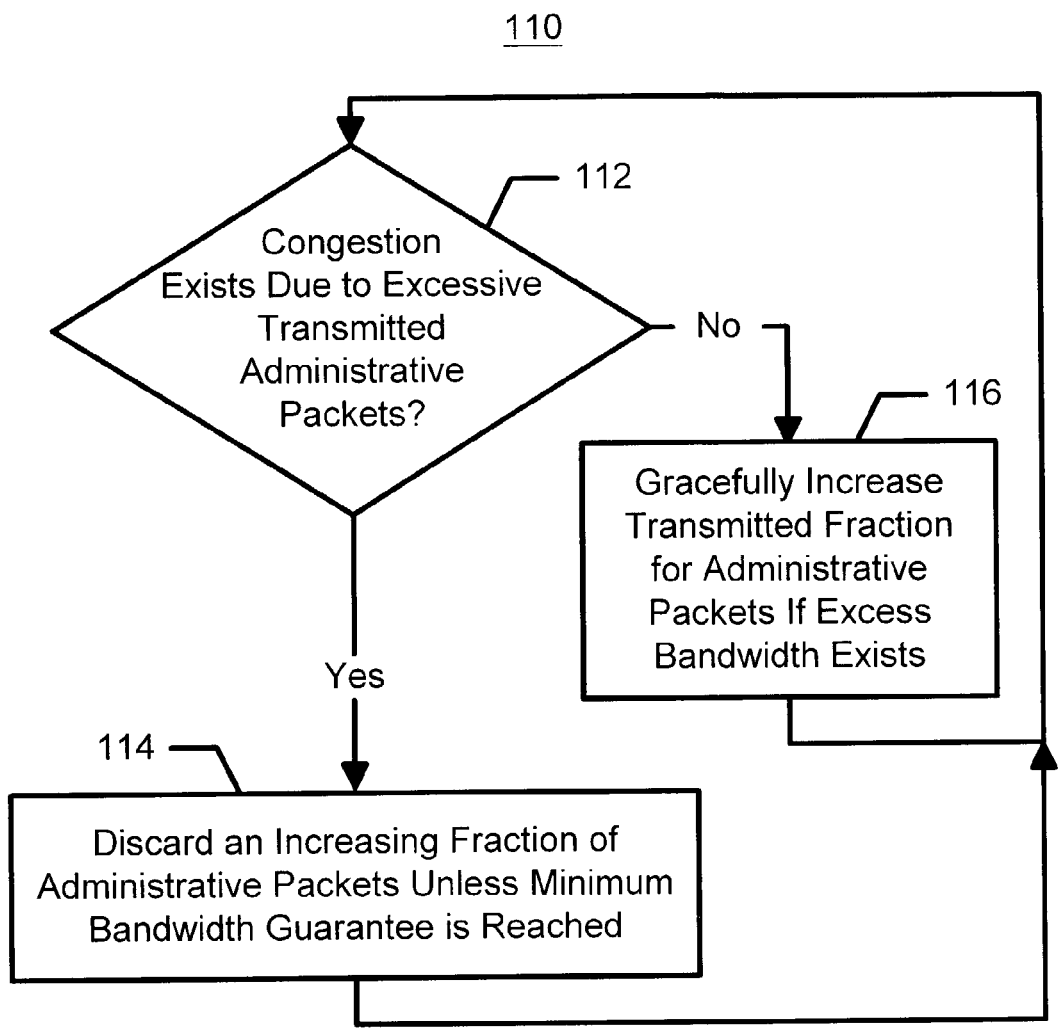
FIG. 6 is a flow chart depicting one embodiment of a method in accordance with the present invention for managing DoS attacks, preferably using a switch.

FIG. 6 depicts one embodiment of a method 110 for managing attacks, such as a denial of service attacks, in a computer system. The method 110 is preferably one implementation of the method 100. The method 110 is preferably accomplished using technology described in the above-identified U.S. Pat. No. 7,142,552. The method 110 can be used with the switch 10 or 10' shown in FIGS. 1, 2A and 2B. Thus, the method 110 can be carried out in a switch 10 having multiple blades 7, 8 and 9 and multiple ports on each blade 7, 8 or 9. In addition, for clarity, the method 110 will be described in conjunction with the enqueuing mechanism 20 and queue 22 of switch 10 depicted in FIG. 2A. However, the method 110 can be used with the enqueuing mechanism 14 and queue 16 of switch 10, with the enqueuing mechanism 26 and queue 28 of switch 10, or with other switches (not shown) having different and/or additional components.

The method 110 is preferably repeated at a constant frequency. It is also preferably used to manage attacks at when traffic enters or leaves a cloud 50, 52, 54, 56, 60, 62, 64, or 70. Thus, the switch 10 is preferably located at the edge of a cloud 50, 52, 54, 56, 60, 62, 64, or 70 and provides traffic to or from an external destination or source, respectively. The method 110 will, therefore, be described in the context of the cloud 54 receiving or sending packets. However, nothing prevents the method 110 from being used in another portion of the cloud 50, 52, 54, 56, 60, 62, 64, or 70, between individual hosts, between networks, and/or between autonomous systems in a cloud 50, 52, 54, 56, 60, 62, 64, or 70. Moreover, the method 110 is preferably performed in addition to differentiated services being performed. Consequently, in the absence of action being taken, as described below, excess bandwidth is preferably fairly allocated among different behavior aggregate flows at points of potential congestion.

Referring to FIGS. 2A and 6, the method 110 preferably commences after the network administrator for the cloud 54, or other authorized user, has set a minimum bandwidth guarantee and maximum bandwidth limit for administrative packets. Note that the minimum bandwidth could be zero. Alternatively, the minimum bandwidth guarantee and maximum bandwidth limit could be equal. In a preferred embodiment, the minimum bandwidth guarantee and maximum bandwidth limit are for all administrative packets such as all SYN, SYN/ACK, RST, FIN packets in TCP or all ICMP packets. However, in an alternate embodiment, there can be different minimum and maximum bandwidth values assigned for different types of administrative packets. Thus, for example, RST packets may be treated differently than SYN packets.

Whether excessive rates of transmission of some type(s) of administrative packets exist is determined via step 112. Thus, step 112 is one method for determining whether congestion exists. In a preferred embodiment, step 112 is performed by the enqueuing mechanism 20 for the queue 22. Step 112 preferably includes determining whether some portion of the administrative packets in the aggregate flow meets or exceeds the corresponding maximum bandwidth limit. For example, if the maximum bandwidth limit described above is for all administrative packets, step 112 preferably determines whether all of the administrative packets flowing through the switch 10 would exceed the corresponding maximum bandwidth limit.

If it is determined that congestion exists because of excessive rates of transmission of administrative packets, then a portion of the plurality of administrative packets is discarded, via step 114. The portion of the plurality of packets discarded in step 114 is sufficient to ensure that a remaining portion of the administrative packets transmitted is not more than the maximum packet bandwidth limit and, provided sufficient offered traffic exists, not less than the minimum bandwidth guarantee. Thus, an increasing fraction of administrative packets are discarded in step 114 until and unless the minimum bandwidth guarantee is reached. In a preferred embodiment, if the maximum bandwidth limit is exceeded, then the portion of administrative packets discarded rapidly increases and drives the rate of transmitted administrative packets in the pipeline to at or below the maximum bandwidth limit. In a preferred embodiment, if congestion signal continuously is true, then the portion of administrative packets discarded rapidly increases and drives the rate of transmitted administrative packets in the pipeline to the minimum bandwidth guarantee. For example, the portion of administrative packets transmitted may be exponential decreased. In other words, the portion of administrative packets transmitted may be repeatedly multiplied by a positive number less than one, such as 31/32, at every instance of a certain time interval to rapidly drive the administrative traffic to the minimum bandwidth guarantee. However, in an alternate embodiment, a different number of administrative packets are discarded in step 114. In addition, the rates of certain administrative packets discarded in step 114 preferably correspond to the administratively configured minimum and maximum bandwidth values. For example, if the minimum bandwidth guarantee and maximum bandwidth limit described above are for all administrative packets, step 114 preferably discards a portion of all administrative packets. In addition, step 114 is preferably performed by the enqueuing mechanism 20. As a result, the discarded administrative packets preferably do not reach the corresponding queue 22. The discard mechanism periodically returns to 112 to refresh the discard rate.

If it is determined that congestion does not exist for the administrative packets and if there is excess bandwidth as defined above, then a preferably increasing fraction of the administrative packets is transmitted, via step 116. For example, the fraction of transmitted administrative packets may be increased linearly until some limit is reached. Note that step 116 could be implemented in accordance with the method and apparatus described in the above-identified U.S. Pat. No. 7,142,552. Step 112 is then returned to.

Because congestion of administrative packets is used as a trigger for discarding a greater portion of the administrative packets traveling through the switch 10, the method 110 can manage attacks, such as DoS attacks. Furthermore, because of the use of minimum and maximum administrative packet bandwidth values, the method 110 can more effectively protect against attacks, such as DoS attacks, by rapidly but gracefully reducing the number of administrative packets flowing through the switch while improving performance of the switch 10. For example, excess bandwidth is still allocated in a fair manner, and the fraction of administrative packets discarded may then be varied to ensure that an appropriate amount of suspicious traffic is discarded.

Figure 7:
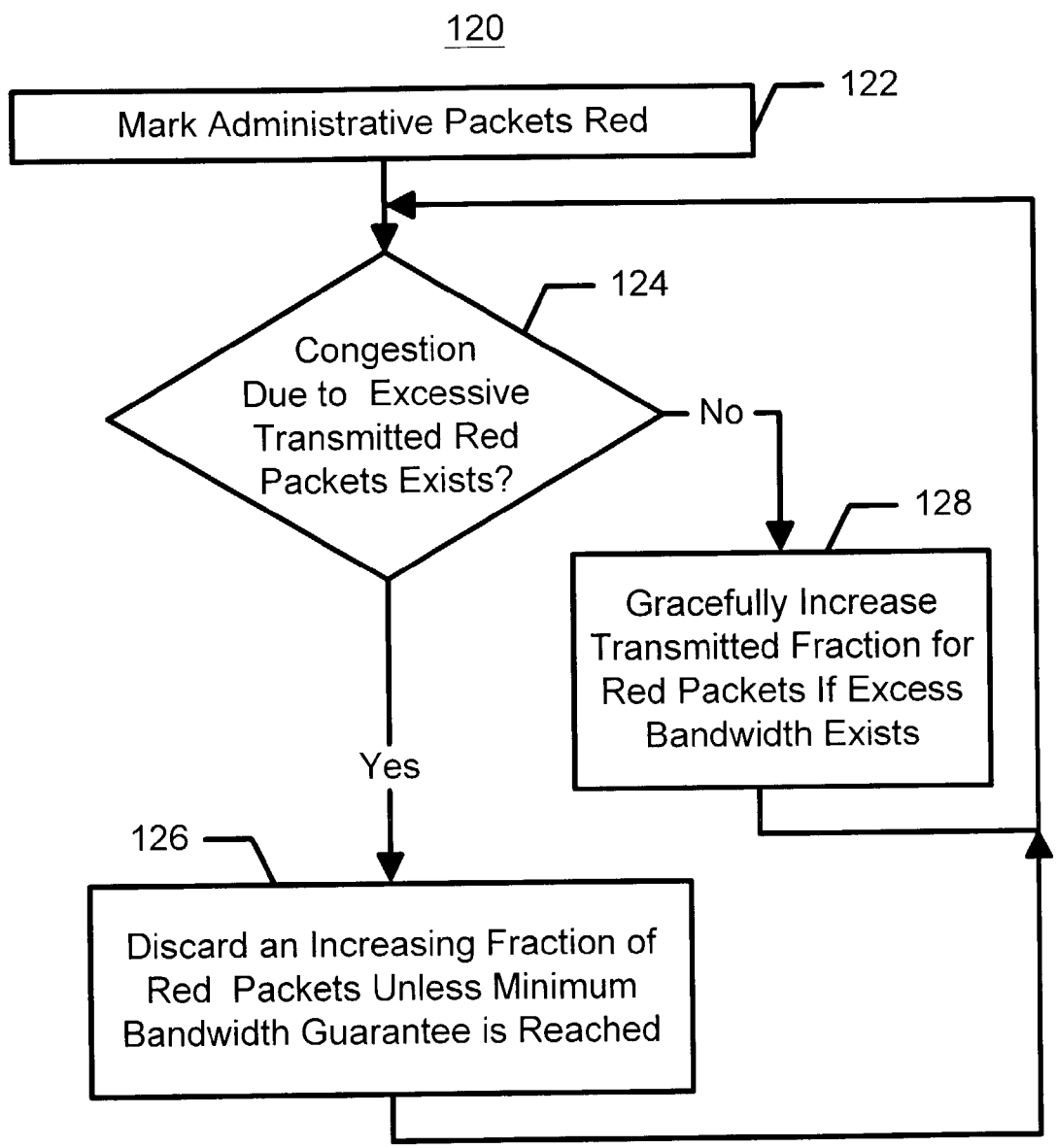
FIG. 7 is a more detailed flow chart of one embodiment of a method in accordance with the present invention for managing DoS attacks, preferably using a switch.

FIG. 7 is a more detailed flow chart of one embodiment of a method 120 in accordance with the present invention for managing DoS attacks, preferably using a switch. The method 120 can be viewed as one implementation of the method 100. The method 120 is preferably accomplished using technology described in the above-identified U.S. Pat. No. 7,142,552. The method 120 can be used with the switch 10 or 10' shown in FIGS. 1, 2A and 2B. Thus, the method 120 can be implemented in a switch 10 having multiple blades 7, 8 and 9 and multiple ports on each blade 7, 8 or 9. In addition, for clarity, the method 120 will be described in conjunction with the enqueuing mechanism 20 and queue 22 of switch 10 depicted in FIG. 2A. However, the method 120 can be used with other enqueuing mechanisms or switches (not shown) having different and/or additional components. The method 120 is also preferably used to manage attacks at when traffic enters or leaves a cloud 50, 52, 54, 56, 60, 62, 64, or 70. Thus, the switch 10 is preferably located at the edge of a cloud 50, 52, 54, 56, 60, 62, 64, or 70 and provides traffic to or from an external destination or source, respectively. The method 120 will, therefore, be described in the context of the cloud 54 receiving or sending packets. Moreover, the method 120 is preferably performed in addition to differentiated services being performed. Consequently, in the absence of action being taken, as described below, excess bandwidth is preferably allocated in a fair manner among different behavior aggregate flows at a point of potential congestion.

Referring to FIGS. 2A and 7, the method 120 preferably commences after the network administrator for the cloud 54, or other authorized user, has set a minimum bandwidth guarantee and maximum bandwidth limit for red packets in a particular behavior aggregate flow. Note that the minimum bandwidth guarantee could be zero. Alternatively, the minimum bandwidth guarantee and maximum bandwidth limit could be positive and equal. In a preferred embodiment, the minimum bandwidth guarantee and maximum bandwidth limit are for the red pipeline, discussed below.

Certain administrative packets are marked red before they enter the cloud 54 by a machine outside the cloud 54 or as they the cloud 54, via step 122. In one embodiment, all administrative packets are marked red in step 122. In an alternative embodiment, only certain administrative packets are marked red in step 122. In another alternative embodiment, certain administrative packets are marked red in step 122 when a certain tag in the packet header fields (e.g., the DiffServ code point header field) indicates that the packet should be marked red. In one embodiment, whether administrative packets are marked red and which administrative packets are marked red depends upon other factors. In one such alternate embodiment, the marking of administrative packets depends upon the flow of administrative packets through a token bucket mechanism. For example, an implementation of such mechanisms as described in IETF RFC 2697 and IETF RFC 2698 could be used. In such an embodiment, administrative packets can be marked based upon the committed information rate (CIR), and peak information rate (PIR), committed burst size (CBS), and peak burst size (PBS). The CIR and PIR, over a sufficiently long time interval, correspond roughly to the concepts of minimum bandwidth guarantee and maximum bandwidth limit. If a flow rate exceeds PIR for a sufficiently long time, many or most packets in the flow will be marked red in step 122. Otherwise, the administrative packets may be marked another color. To maintain order, the administrative packets are fed into one flow control mechanism with different probabilities of transmission into a common queue based upon color. The packets marked red have a lower probability of transmission into the common queue than yellow or green packets. In the embodiments described above, step 122 is preferably performed within the enqueuing mechanism 20.

It is determined whether an excessive transmission rate of the red, administrative exists, packets, via step 124. Thus, step 124 is one method for determining whether congestion exists. In a preferred embodiment, step 124 is performed by the enqueuing mechanism 20 for the queue 22. Step 124 preferably includes determining whether the red, administrative packet flow rate exceeds the corresponding maximum bandwidth limit.

If it is determined that an excessive transmission rate exists for the red pipeline, then a portion of the plurality of red packets is discarded, via step 126. The portion of the plurality of packets discarded in step 126 is after at most a brief time sufficient to ensure that a remaining portion of the red packets transmitted is not more than the maximum bandwidth limit. Preferably, step 126 discards an increasing fraction of the red packets unless and until the minimum bandwidth guarantee is reached. In a preferred embodiment, if congestion persists, then the increasing portion of red packets discarded rapidly drives the transmitted red packets to, but not below, the minimum bandwidth guarantee. For example, the portion of red packets transmitted may be exponentially decreased over certain time intervals to rapidly drive the red traffic in the pipeline to the minimum bandwidth guarantee. However, in an alternate embodiment, a different number of red packets are discarded in step 126. In addition, step 126 is preferably performed by the enqueuing mechanism 20. As a result, the discarded administrative packets preferably do not reach the corresponding queue 22. Step 124 is then returned to.

If it is determined that an excessive transmission rate does not exist for the red pipeline, which the red packets traverse, then, if there is excess bandwidth, a preferably increasing fraction of the red packets are transmitted, via step 128. For example, the bandwidth allocated to the red pipeline packets may be increased linearly until some limit is reached. The bandwidth allocated to red packets may be linearly increased until the excess bandwidth is small or zero. Note that step 128 may be optional. In a preferred embodiment, because the method 120 is assumed to be performed with differentiated services as a background, the excess bandwidth may still be allocated even in the absence of step 128. The allocation of excess bandwidth would then be performed by the mechanism that performs differentiated services, such as the method and apparatus described in the above-identified U.S. Pat. No. 7,142,552. Step 124 is then returned to.

Because administrative packets are marked red and congestion of the red pipeline is used as a trigger for discarding a greater portion of the red packets traveling through the switch 10, the method 120 can manage attacks, such as DoS attacks. Furthermore, because of the use of minimum bandwidth guarantee and maximum bandwidth limit for the red pipeline, the method 120 can more effectively protect against attacks, such as DoS attacks, by rapidly reducing the number of administrative packets flowing through the switch while improving performance of the switch 10. For example, excess bandwidth is still allocated in a fair manner, and the fraction of administrative packets discarded may then be varied to ensure that an appropriate amount of suspicious traffic is discarded.

Figure 8:
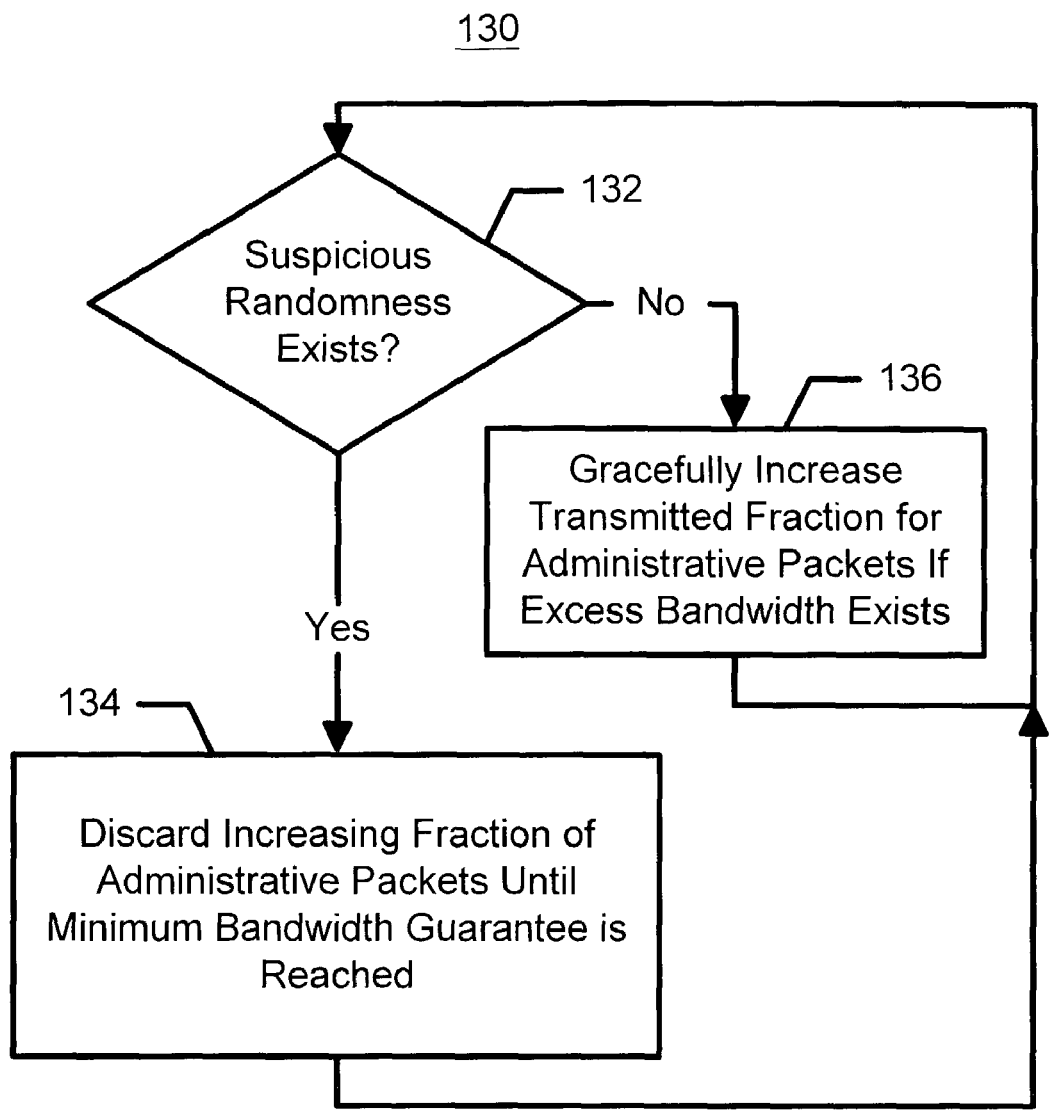
FIG. 8 is a more detailed flow chart of a second embodiment of a method in accordance with the present invention for managing DoS attacks, preferably using a switch.

FIG. 8 is a more detailed flow chart of a second embodiment of a method 130 in accordance with the present invention for managing DoS attacks, preferably using a switch. The method 130 can be viewed as one implementation of the method 100. The method 130 is preferably accomplished using technology described in U.S. Patent Application Publication No. 2003/0200441 and entitled "DETECTING RANDOMNESS IN COMPUTER NETWORK TRAFFIC" and assigned to the assignee of the present invention, the disclosure of which is hereby incorporated by reference. The method 130 can be used with the switch 10 or 10' shown in FIGS. 1, 2A and 2B. Thus, the method 130 can be carried out in a switch 10 having multiple blades 7, 8 and 9 and multiple ports on each blade 7, 8 or 9. In addition, for clarity, the method 130 will be described in conjunction with the enqueuing mechanism 20 and queue 22 of switch 10 depicted in FIG. 2A. However, the method 130 can be used with other enqueuing mechanisms and/or other switches (not shown) having different and/or additional components. The method 130 is also preferably used to manage attacks at when traffic enters or leaves a cloud 50, 52, 54, 56, 60, 62, 64, or 70. Thus, the switch 10 is preferably located at the edge of a cloud 50, 52, 54, 56, 60, 62, 64, or 70 and provides traffic to or from an external destination or source, respectively. The method 130 will, therefore, be described in the context of the cloud 54 receiving or sending packets. However, nothing prevents the method 130 from being used in another portion of the cloud 50, 52, 54, 56, 60, 62, 64, or 70, between individual hosts, between networks, and/or between autonomous systems in a cloud 50, 52, 54, 56, 60, 62, 64, or 70. Moreover, the method 130 is preferably performed in addition to differentiated services being performed. Consequently, in the absence of action being taken, as described below, excess bandwidth is preferably fairly allocated between different behavior aggregate flows and different levels of service provided for different pipelines.

Referring to FIGS. 2A and 8, the method 130 preferably commences after the network administrator for the cloud 54, or other authorized user, has set a minimum bandwidth guarantee and maximum bandwidth limit for administrative packets. Note that the minimum bandwidth guarantee could be zero. Alternatively, the minimum bandwidth guarantee and maximum bandwidth limit could be positive and equal. In a preferred embodiment, the minimum and maximum bandwidth values are for all administrative packets. However, in an alternate embodiment, the minimum bandwidth guarantee and maximum bandwidth limit can be configured for different types of administrative packets. Thus, for example, RST packets may be treated differently than SYNs.

It is determined whether suspicious randomness in the administrative packets exists, via step 132. Thus, step 132 is one method for determining whether congestion exists. Stated differently, suspicious randomness can be considered to be a type of congestion. In a preferred embodiment, step 132 is performed by the enqueuing mechanism 20 for the queue 22. In general, suspicious randomness includes randomness that is indicative of malicious traffic, such as the types of randomness described below. In one embodiment, suspicious randomness could include traffic that simply has more variable values in some respect (such as numerous, sequential Source Address (SA) values), as opposed to evidently random values. In a preferred embodiment, step 132 includes determining whether some particular type of the administrative packets in the aggregate flow meets or exceeds a particular maximum bandwidth limit. For example, step 132 may include both determining whether field values (such as SA) are random and determining whether certain well-known flood attack types of administrative packets, such as TCP SYN, TCP SYN/ACK, TCP RST, ICMP host unreachable, or ICMP TTL, have exceeded a minimum bandwidth guarantee for the corresponding type of administrative packet. Step 132 might also include detecting Smurf attacks, preferably by determining whether numerous ICMP pings use a target's address as the source address of the ICMP ping. In another embodiment, step 132 includes limiting ICMP pings, to prevent ping flooding on high bandwidth links that have low bandwidth connectivity. In such an embodiment, a hash function on the source address, or other fields, of the packets may be calculated. In one embodiment, the hash of the SA (or other field or fields) for each of N consecutive packets is calculated. The hash value calculated preferably has B bits. The N packets are considered to constitute an epoch. The hash values are then stored, preferably in a register. The number, N, of consecutive packets preferably can vary. The number N is adjusted at the end of each epoch so that a particular fraction, F, of the hash values is used each epoch. This fraction is preferably one-fourth of the possible $2^B$ hash values. The allowed number of consecutive packets that constitute an epoch also has a desired maximum value, M. Preferably, an exponential weighting method is used to update the number of packets, N, in an epoch. In particular, in a preferred embodiment, N(i+1)=K*N(i)+{if number of hits is less than F, then (1−K)*M and 0 otherwise}. Here, K is a dimensionless constant such as ¾ that is greater than or equal to zero and less than one. Updating this equation will ensure that N comes to a desired state. In such an embodiment, suspicious randomness would be considered to exist when N decreases below a particular level. In other words, in such an embodiment, when N is near M, suspicious randomness or high variability that is not evidently random is considered not to exist. In addition, statistics on fields of some administrative packets, such as the Destination Address (DA) of packets such as SYN packets, could be used as above to determine suspicious randomness. If a large number of different destination addresses is detected, then suspicious randomness would be considered to exist in step 132.

If it is determined that suspicious randomness exists in some type of administrative traffic in combination with a traffic rate in excess of a minimum bandwidth guarantee, then a portion of the plurality of administrative packets can be discarded, via step 134. The portion of the plurality of packets discarded in step 134 is sufficient to ensure that a remaining portion of the administrative packets transmitted is not more than the maximum packet bandwidth limit and, assuming that there is a sufficient offered traffic load, not less than the minimum bandwidth guarantee. Thus, step 134 preferably discards an increasing fraction of the administrative packets until the minimum bandwidth guarantee is reached. In a preferred embodiment, the portion of administrative packets discarded during instances of excessive randomness rapidly drives the transmitted administrative packets in the behavior aggregate flow of the traffic type to its minimum bandwidth guarantee. For example, the portion of administrative packets transmitted may be exponentially decreased with a certain constant period to rapidly drive the administrative traffic to the minimum guarantee. However, in an alternate embodiment, a different number of administrative packets are discarded in step 134. In addition, the type of administrative packets discarded in step 134 preferably matches the corresponding type(s) of packets monitored for suspicious randomness. In addition, step 134 is preferably performed by the enqueuing mechanism 20. As a result, the discarded administrative packets preferably do not reach the corresponding queue 22.

If it is determined that suspicious randomness does not exist, then, if there is excess bandwidth, a preferably increasing fraction of the administrative packets is transmitted, via step 136. For example, the fraction of transmitted traffic of the administrative packets may be increased linearly until a limit of one is reached. Note that step 136 can be considered to be optional. In a preferred embodiment, because the method 130 is assumed to be performed with differentiated services as a background, the excess bandwidth may still be allocated even in the absence of step 136. The allocation of excess bandwidth would then be performed by the mechanism that performs differentiated services, such as the method and apparatus described in the above-identified U.S. Pat. No. 7,142,552.

Because suspicious randomness is used as a trigger for discarding a greater portion of the administrative packets traveling through the switch 10, the method 130 can manage certain attacks, such as DoS attacks. Furthermore, because of the use of minimum and maximum administrative packet bandwidth values, the method 130 can more effectively protect against attacks, such as DoS attacks, by rapidly reducing the number of administrative packets flowing through the switch while improving performance of the switch 10. For example, excess bandwidth is still allocated in a fair manner, and the fraction of administrative packets discarded may then be varied to ensure that an appropriate amount of suspicious traffic is discarded.

Thus, using the methods 100, 110, 120, and/or 130, attacks, such as DoS attacks can be better managed. In addition, the method 100 may include one or more of the methods 110, 120 and/or 130. In addition, the manner in which packets are discarded and bandwidth is allocated allows for denial of service attacks to be detected and accounted for gracefully, high utilization, low latency, fast convergence to a desired allocation and fair allocation in that excess bandwidth is allocated equally among different pipes.

A method and system has been disclosed for responding to attacks, such as DoS attacks in a computer system. Software written according to the present invention is to be stored in some form of computer-readable medium, such as memory, CD-ROM, or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method implemented in a programmable device for managing attacks in a computer system, the computer system used in sending, receiving, or sending and receiving a plurality of packets, the plurality of packets comprising a plurality of administrative packets and a plurality of data packets, the method comprising the steps of:

determining periodically in the programmable device whether a congestion of the administrative packets exists based on determining that a suspicious randomness exists, the congestion of the administrative packets indicating that a potential attack exists, and wherein determining whether the suspicious randomness exists comprises the steps of:

calculating hash values of sequential source addresses for each of a number of consecutive packets in an epoch, wherein the hash values have B bits and the number of consecutive packets in the epoch is represented by N;

storing the hash values in a register;

specifying an allowed number of consecutive packets that constitute an epoch to be a maximum value, M;

adjusting the number represented by N at an end of each epoch so that a particular fraction, represented by F, of the hash values is used each epoch by an exponential weighting method, wherein in F is one-fourth of possible $2^B$ hash values, and wherein the exponential weighting method uses a formula N(i+1)=K*N(i)+{if number of hits is less than F, then (1−K)*M and 0 otherwise}, wherein K is a dimensionless constant greater than or equal to zero and less than one; and responsive to N decreasing below a particular level, determining that the suspicious randomness exists;

responsive to determining that the congestion of the administrative packets exists, continuously discarding via the programmable device a number of the plurality of administrative packets until a remaining number of the plurality of administrative packets transmitted is not more than a set maximum administrative packet bandwidth limit and is not less than a set minimum administrative packet bandwidth guarantee, the number of the plurality of administrative packets being determined by the programmable device based on the set maximum administrative packet bandwidth limit and the set minimum administrative packet bandwidth guarantee, such that the number of the plurality of administrative packets to be discarded is rapidly increased driving a rate of transmitted administrative packets to at or below the maximum administrative packet bandwidth limit; and responsive to determining that the congestion of the administrative packets does not exist and that there is excess bandwidth available, linearly increasing the number of transmitted administrative packets until a limit is reached.

2. The method of claim 1, wherein determining periodically in the programmable device whether a congestion of the administrative packets exists comprises:

determining congestion exists if the sending, receiving, or sending and receiving the plurality of administrative packets would exceed the maximum administrative packet bandwidth limit.

3. The method of claim 1, wherein the plurality of administrative packets comprise a plurality of types of administrative packets and wherein determining periodically in the programmable device whether a congestion of the administrative packets exists comprises:

determining congestion exists if the transmitting a particular type of the plurality of types of administrative packets would exceed a maximum packet bandwidth limit for the particular type of the plurality of types of administrative packets.

4. The method of claim 3, wherein discarding via the programmable device a number of the plurality of administrative packets comprises:

discarding a first number of the particular type of the plurality of types of administrative packets such that a first remaining number of the particular type of the plurality of types of administrative packets transmitted is not less than a minimum packet bandwidth guarantee for the particular type of the plurality of types of administrative packets and not more than the maximum packet bandwidth limit.

5. The method of claim 1, wherein determining periodically in the programmable device whether a congestion of the administrative packets exists comprises:

determining whether the plurality of administrative packets constitute at least a percentage of the plurality of packets.

6. The method of claim 1, wherein determining periodically in the programmable device whether a congestion of the administrative packets exists comprises:

determining whether a particular type of the plurality of administrative packets reaches a particular limit.

7. The method of claim 1, wherein the computer system comprises a cache and wherein determining periodically in the programmable device whether a congestion of the administrative packets exists comprises:

determining congestion exists if the cache reaches a particular occupancy level.

8. The method of claim 1, wherein determining periodically in the programmable device whether a congestion of the administrative packets exists comprises:

marking a portion of the plurality of administrative packets as red packets, red being associated with a particular maximum bandwidth limit for a red pipeline;

determining congestion exists in the red pipeline if the particular maximum bandwidth limit for the red pipeline is exceeded; and responsive to determining congestion exists for the red pipeline, continuously discarding an increasing fraction of the red packets until the particular maximum bandwidth for the red pipeline no longer exceeded.

9. The method of claim 8, wherein marking a portion of the plurality of administrative packets as red packets is in response to a particular tag in a DiffServ code point header field.

10. The method of claim 1, wherein discarding via the programmable device the number of the plurality of administrative packets comprises discarding an exponentially increasing number of the plurality of administrative packets for each instance of a time interval at which it is determined that congestion of the administrative packets exists.

11. A computer program product for managing attacks in a computer system, the computer system used in sending, receiving, or sending and receiving a plurality of packets, the plurality of packets comprising a plurality of administrative packets and a plurality of data packets, the computer program product comprising a non-transitory computer-readable storage medium having computer readable code embodied therewith, the computer-readable code comprising:

computer readable code configured to determine periodically whether a congestion of the administrative packets exists based on determining that a suspicious randomness exists, the congestion of the administrative packets indicating that a potential attack exists, wherein the computer readable code configured to determine whether the suspicious randomness exists comprises:

computer readable code configured to calculate hash values of sequential source addresses for each of a number of consecutive packets in an epoch, wherein the hash values have B bits and the number of consecutive packets in the epoch is represented by N;

computer readable code configured to store the has values in a register;

computer readable code configured to, specify an allowed number of consecutive packets that constitute an epoch to be a maximum value, M;

computer readable code configured to adjust the number represented by N at an end of each epoch so that a particular fraction, represented by F, of the hash values is used each epoch by an exponential weighting method, wherein in F is one-fourth of possible $2^B$ hash values, and wherein the exponential weighting method uses a formula $N(i+1)=K*N(i)+\{$if number of hits is less than F, then $(1-K)*M$ and 0 otherwise$\}$, wherein K is a dimensionless constant greater than or equal to zero and less than one; and responsive to N decreasing below a particular level, determine that the suspicious randomness exists;

computer readable code configured to, responsive to determining that the congestion of the administrative packets exists, continuously discard a number of the plurality of administrative packets until a remaining number of the plurality of administrative packets transmitted is not more than a set maximum administrative packet bandwidth limit and is not less than a set minimum administrative packet bandwidth guarantee, the number of the plurality of administrative packets being determined based on the set maximum administrative packet bandwidth limit and the set minimum administrative packet bandwidth guarantee, such that the number of the plurality of administrative packets to be discarded is rapidly increased driving a rate of transmitted administrative packets to at or below the maximum administrative packet bandwidth limit; and computer readable code configured to, responsive to determining that the congestion of the administrative packets does not exist and that there is excess bandwidth available, linearly increase the number of transmitted administrative packets until a limit is reached.

12. The computer program product of claim 11, wherein the computer readable code configured to determine periodically whether a congestion of the administrative packets exists comprises:

computer readable code configured to determine congestion exists when sending, receiving, or sending and receiving the plurality of administrative packets would exceed the maximum administrative packet bandwidth limit.

13. The computer program product of claim 11, wherein the plurality of administrative packets comprise a plurality of types of administrative packets and wherein the computer readable code configured to determine periodically whether a congestion of the administrative packets exists comprises:

computer readable code configured to determine congestion exists when transmitting a particular type of the plurality of types of administrative packets would exceed a maximum packet bandwidth limit for the particular type of the plurality of types of administrative packets.

14. The computer program product of claim 13, wherein the computer readable code configured to discard the number of the plurality of administrative packets comprises:

computer readable code configured to discard a first number of the particular type of the plurality of types of administrative packets such that a first remaining number of the particular type of the plurality of types of administrative packets transmitted is not less than a minimum packet bandwidth guarantee for the particular type of the plurality of types of administrative packets and not more than the maximum packet bandwidth limit.

15. The computer program product of claim 11, wherein the computer readable code configured to determine periodically whether a congestion of the administrative packets exists comprises:

computer readable code configured to determine whether the plurality of administrative packets constitute at least a percentage of the plurality of packets.

16. The computer program product of claim 11, wherein the computer readable code configured to determine periodically whether a congestion of the administrative packets exists comprises:

computer readable code configured to determine whether a particular type of the plurality of administrative packets reaches a particular limit.

17. The computer program product of claim 11, wherein the computer system comprises a cache and wherein the computer readable code configured to determine periodically whether a congestion of the administrative packets exists comprises:

computer readable code configured to determine congestion exists if the cache reaches a particular occupancy level.

18. The computer program product of claim 11, wherein the computer readable code configured to determine periodically whether a congestion of the administrative packets exists comprises:

computer readable code configured to mark a portion of the plurality of administrative packets as red packets, red being associated with a particular maximum bandwidth limit for a red pipeline;

computer readable code configured to determine congestion exists in the red pipeline if the particular maximum bandwidth limit for the red pipeline red is exceeded; and computer readable code configured, responsive to determining congestion exists for the red pipeline, to continuously discard an increasing fraction of the red packets until the particular maximum bandwidth for the red pipeline no longer exceeded.

19. The computer program product of claim 18, wherein marking a portion of the plurality of administrative packets as red packets is in response to a particular tag in a DiffServ code point header field.

20. The computer program product of claim 11, wherein the computer readable code configured to discard the number of the plurality of administrative packets comprises computer readable code configured to discard an exponentially increasing number of the plurality of administrative packets for each instance of a time interval at which it is determined that congestion of the administrative packets exists.

21. A system for managing attacks in a computer network, the system comprising:

a switch, the switch used in sending, receiving, or sending and receiving a plurality of packets to, from, or to and from the computer network, the plurality of packets comprising a plurality of administrative packets and a plurality of data packets;

a queue for use in transmitting traffic through the switch; and an enqueuing mechanism, coupled with the queue, for controlling traffic through the switch using a minimum administrative packet bandwidth guarantee and a maximum administrative packet bandwidth limit, wherein the enqueuing mechanism configured to:

determine periodically whether a congestion of the administrative packets exists based on determining that a suspicious randomness exists, the congestion of the administrative packets indicating that a potential attack exists, wherein determining whether the suspicious randomness exists comprises:

calculating hash values of sequential source addresses for each of a number of consecutive packets in an epoch, wherein the hash values have B bits and the number of consecutive packets in the epoch is represented by N, storing the hash values in a register, specifying an allowed number of consecutive packets that constitute an epoch to be a maximum value, M, adjusting the number represented by N at an end of each epoch so that a particular fraction, represented by F, of the hash values is used each epoch by an exponential weighting method, wherein in F is one-fourth of possible $2^B$ hash values, and wherein the exponential weighting method uses a formula $N(i+1)=K*N(i)+\{$if number of hits is less than F, then $(1-K)*M$ and 0 otherwise$\}$, wherein K is a dimensionless constant greater than or equal to zero and less than one, and responsive to N decreasing below a particular level, determining that the suspicious randomness exists;

responsive to determining that the congestion of the administrative packets exists, continuously discard a number of the plurality of administrative packets until a remaining number of the plurality of administrative packets transmitted is not more than the set maximum administrative packet bandwidth limit and is not less than the set minimum administrative packet bandwidth guarantee, the number of the plurality of administrative packets being determined based on the maximum administrative packet bandwidth limit and the minimum administrative packet bandwidth guarantee, such that the number of the plurality of administrative packets to be discarded is rapidly increased driving a rate of transmitted administrative packets to at or below the maximum administrative packet bandwidth limit; and responsive to determining that the congestion of the administrative packets does not exist and that there is excess bandwidth available, linearly increase the number of transmitted administrative packets until a limit is reached.

22. The system of claim 21, wherein the enqueuing mechanism further determines that congestion exists when sending, receiving, or sending and receiving the plurality of administrative packets would exceed the maximum administrative packet bandwidth limit.

23. The system of claim 21, wherein the plurality of administrative packets comprise a plurality of types of administrative packets and wherein the enqueuing mechanism further determines that congestion exists when transmitting a particular type of the plurality of types of administrative packets would exceed a maximum packet bandwidth limit for the particular type of the plurality of types of administrative packets.

24. The system of claim 23, wherein the enqueuing mechanism further discards a first number of the particular type of the plurality of types of administrative packets such that a first remaining number of the particular type of the plurality of types of administrative packets transmitted is not less than a minimum packet bandwidth guarantee for the particular type of the plurality of types of administrative packets and not more than the maximum packet bandwidth limit.

25. The system of claim 21, wherein the enqueuing mechanism further determines that congestion exists by determining whether the plurality of administrative packets constitute at least a percentage of the plurality of packets.

26. The system of claim 21, wherein the enqueuing mechanism further determines that congestion exists by determining whether a particular type of the plurality of administrative packets reaches a particular limit.

27. The system of claim 21, wherein the computer network includes a cache and wherein the enqueuing mechanism further determines that congestion exists if the cache reaches a particular occupancy level.

\* \* \* \* \*